(12) United States Patent
Nishigaki et al.

(10) Patent No.: US 8,690,337 B2
(45) Date of Patent: Apr. 8, 2014

(54) DEVICE AND METHOD FOR DISPLAYING AN IMAGE ON A VUI SCREEN AND ALSO A MAIN PROJECTION SCREEN

(75) Inventors: Hiroshi Nishigaki, Daito (JP); Atsuya Hirano, Daito (JP); Atsuhiko Chikaoka, Daito (JP); Ken Nishioka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1043 days.

(21) Appl. No.: 12/751,473

(22) Filed: Mar. 31, 2010

(65) Prior Publication Data
US 2010/0253618 A1    Oct. 7, 2010

(30) Foreign Application Priority Data
Apr. 1, 2009   (JP) ................... 2009-089056

(51) Int. Cl.
G03B 21/14  (2006.01)
(52) U.S. Cl.
USPC ............... 353/20; 353/30; 353/31; 353/69; 353/70; 353/99; 348/744; 348/746; 345/30; 345/31
(58) Field of Classification Search
USPC ........... 353/20, 30, 31, 38, 69, 70, 85, 98, 99, 353/102, 121; 235/462.01, 462.1, 462.11, 235/462.24, 462.25, 462.26, 462.42, 235/462.45, 472.02, 462; 348/744–747; 348/E13.025, E13.029, E13.03, E13.033, 348/E13.035, E13.043, E13.058, E13.059; 345/30, 31, 33, 38, 40, 204, 205, 207, 345/208, 691, 173–184; 349/5, 7–9, 43, 45; 359/196.1, 198.1, 213.1, 200.7, 214.1, 359/224.1
See application file for complete search history.

(56) References Cited

U.S. PATENT DOCUMENTS

| | | | | |
|---|---|---|---|---|
| 5,363,117 A * | 11/1994 | Matsuura et al. | | 345/87 |
| 6,200,713 B1 * | 3/2001 | Agostinelli et al. | | 430/22 |
| 6,937,372 B2 * | 8/2005 | Kandori et al. | | 359/198.1 |
| 7,242,388 B2 | 7/2007 | Lieberman et al. | | |
| 7,401,928 B2 * | 7/2008 | Yamamoto et al. | | 353/37 |
| 7,425,073 B2 * | 9/2008 | Wood et al. | | 353/28 |
| 7,901,084 B2 * | 3/2011 | Willey et al. | | 353/49 |
| 8,040,332 B2 * | 10/2011 | Yamazaki et al. | | 345/204 |
| 8,197,066 B2 * | 6/2012 | Nagashima et al. | | 353/20 |
| 2005/0012721 A1 | 1/2005 | Fong et al. | | |
| 2006/0044297 A1 * | 3/2006 | Furukawa et al. | | 345/204 |
| 2006/0221063 A1 | 10/2006 | Ishihara | | |

FOREIGN PATENT DOCUMENTS

| | | |
|---|---|---|
| EP | 1039365 | 9/2000 |
| JP | 2000-305706 | 11/2000 |
| JP | 2003-344059 | 12/2003 |
| JP | 2004-523031 | 7/2004 |

(Continued)

*Primary Examiner* — Sultan Chowdhury
(74) *Attorney, Agent, or Firm* — Morgan, Lewis & Bockius LLP

(57) ABSTRACT

A projector producing an imaginary input plane with high operability is provided. A projector according to an embodiment projects a VUI screen picture onto a desk, and projects a main projection screen picture to a wall. The projector includes a light receiving element. The light receiving element is arranged in a position where light emitted toward the desk (VUI screen picture) and reflected (or scattered) by an object near the desk enters. The projector calculates a position of the object based on light sensing timing by the light receiving element and light scan positions at various points in time. The projector changes a projected screen picture when it determines that object is simultaneously in contact with a plurality of portions of the VUI screen picture and at least one of contact positions moves.

10 Claims, 13 Drawing Sheets

(56) References Cited

FOREIGN PATENT DOCUMENTS

| | | |
|---|---|---|
| JP | 2005-038422 | 2/2005 |
| JP | 2006-277357 | 10/2006 |
| JP | 2006-295779 | 10/2006 |
| JP | 2007-108570 | 4/2007 |
| JP | 2008-070968 | 3/2008 |
| WO | WO 02/054169 | 7/2002 |

* cited by examiner

DEVICE AND METHOD FOR DISPLAYING AN IMAGE ON A VUI SCREEN AND ALSO A MAIN PROJECTION SCREEN

BACKGROUND OF THE INVENTION

1. Field of the Invention

The present invention relates to a technique for projecting an image. Particularly, the invention relates to a device and a method for projecting an image with laser light.

2. Description of the Background Art

Projectors that project an image onto a projection target plane such as a wall are presently used in many places. In recent years, various kinds of projectors have been under development.

An imaginary keyboard is one of uses of the projector. For example, National Publication No. 2004-523031 has disclosed a data input device that can be used as an imaginary keyboard. This data input device includes an illumination device emitting light to an engagement plane, a sensor sensing the light that is emitted by the illumination device and is scattered by engagement of an object with an engagement plane, and a processor receiving an output of the sensor and providing data entry input to a service circuit.

Japanese Patent Laying-Open No. 2005-38422 has disclosed a projector. This projector displays an imaginary keyboard image on a first plane, and displays a user-output display image on a second plane. A lower portion of the imaginary keyboard is overlaid on a keystroke sensing system.

Japanese Patent Laying-Open No. 2000-305706 has disclosed a data input device. This data input device determines data input by sensing an obstruction that temporarily appears in an input area located outside a body of the device. This data input device uses a laser diode and diffraction optics for projecting an picture of a virtual keyboard onto the input area. The data input device uses an infrared transmitting device and an infrared receiving device for sensing a pointer or a finger located on the virtual keyboard.

Japanese Patent Laying-Open No. 2006-295779 has disclosed a portable information device. This portable information device includes a first casing and a second casing openably connected to the first casing. The first casing has a projection-type input display device for projecting the imaginary keyboard onto an input display area, a projection-type display device for projecting character data and image data onto a display area, and an input determining device for sensing an obstruction appearing in the input display area. An open/close angle between the first and second casings is variable. The input display area and the display area of the portable information device can be variably set by changing the open/close angle.

For accepting the user's operation, such a technique has been known that combines a touch panel with a screen displaying an image. For example, a projector device disclosed in Japanese Patent Laying-Open No. 2007-108570 projects a part of light emitted thereby to a slave screen near the projector device. The slave screen includes a screen and a touch panel superimposed on the screen. The projector device transmits a user's operation performed on the slave screen to a PC (Personal Computer) or the like.

The combination of the touch panel and the display screen disclosed in Japanese Patent Laying-Open No. 2007-108570 is also used in devices other than the projector. For example, a display processing device disclosed in Japanese Patent Laying-Open No. 2008-070968 moves, rotates, enlarges or reduces a displayed image based on positional information about two fingers touching the touch panel.

A navigation device disclosed in Japanese Patent Laying-Open No. 2003-344059 senses, through a touch panel, continuous input operations performed on at least two points on a navigation screen displaying a map. Also, the navigation device determines an operation direction of the input operation, and changes a scale of the map according to the operation direction.

SUMMARY OF THE INVENTION

The projector that determines the position of an object or target based on light reflected by the object as is disclosed in National Publication No. 2004-523031 cannot determine the position of the object with high precision. This is due to the facts that the light scattered by the object diverges, and that the angle of the object is not uniform.

Therefore, it is difficult in this type of projector to determine whether a click operation is performed on an imaginary input plane or not. This is because the projector cannot precisely determine the touch of the object on the imaginary input plane. Therefore, the user of the projector cannot perform smooth operations through the imaginary input plane. Further, the user cannot perform various kinds of operations through the imaginary input plane without difficulty.

The invention has been made for overcoming the above problems, and an object of the invention is to provide a projector producing an imaginary input plane providing high operability.

An embodiment provides a device for emitting laser light to display first and second images on first and second projection target planes, respectively. This device includes a laser light source for emitting the laser light; a scanning unit configured to scan the laser light on a frame-by-frame basis; a light splitting element for splitting the laser light scanned by the scanning unit into first laser light directed to the first projection target plane and second laser light directed to the second projection target plane; a photosensor for sensing the second laser light reflected by an external object on the second projection target plane; and a controller configured to control the operation of the image display device. The controller is configured to operate the scanning unit with a predetermined scan frequency, to control timing of emission of the laser light by the laser light source based on image data corresponding to the image and the scan frequency, to calculate a position of the external object based on a scan position of the laser light according to light sensing timing of the light sensor, and to produce an instruction for changing the image data when a plurality of the positions are calculated according to the light sensing timing included in a scan period of a predetermined number of frames and at least one of the positions moves.

A device according to another embodiment includes a laser light source for emitting the laser light. The laser light source includes two-color laser for emitting red laser light and blue laser light, and a green laser for emitting green laser light. The device further includes a resonance MEMS (Micro-Electro Mechanical Systems) mirror for scanning the laser light on a frame-by-frame basis; a beam splitter for splitting the laser light scanned by the resonance MEMS mirror into first laser light directed to the first projection target plane and second laser light directed to the second projection target plane; a photodiode for sensing the second laser light reflected by an external object on the second projection target plane; and a controller for controlling the operation of the image display device. The controller is configured to operate the resonance MEMS mirror with a predetermined scan frequency, to control emission of the laser light by the laser light source based on image data corresponding to the image and the scan frequency, to calculate a position of the external object based on a scan position of the laser light according to light sensing timing of the photodiode, and to produce an instruction for changing the image data when a plurality of the positions are calculated according to the light sensing timing during a period of scanning of a predetermined number of frames by the resonance MEMS mirror and at least the position moves.

Preferably, the controller is configured to produce the instruction when a first calculated position is in a predetermined region and a second calculated position moves.

A method for displaying an image includes the steps of emitting laser light by a laser light source; scanning the laser light by a scanning unit on a frame-by-frame basis; splitting the scanned laser light into first laser light directed to the first projection target plane and second laser light directed to the second projection target plane; sensing the second laser light reflected by an external object on the second projection target plane; operating the scanning unit with a predetermined scan frequency; controlling timing of emission of the laser light by the laser light source based on image data corresponding to the image and the scan frequency; calculating a position of the external object based on a scan position of the laser light according to timing of sensing of the second laser light; and producing an instruction for changing the image data based on the facts that a plurality of the positions are calculated according to timing included in a scan period of a predetermined number of frames and that at least one of the positions moves.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the following description, the same portions bear the same reference numbers and the same names, and achieve the same functions. Therefore, description thereof is not repeated.

[First Embodiment]
<Summary>

Figure 1:
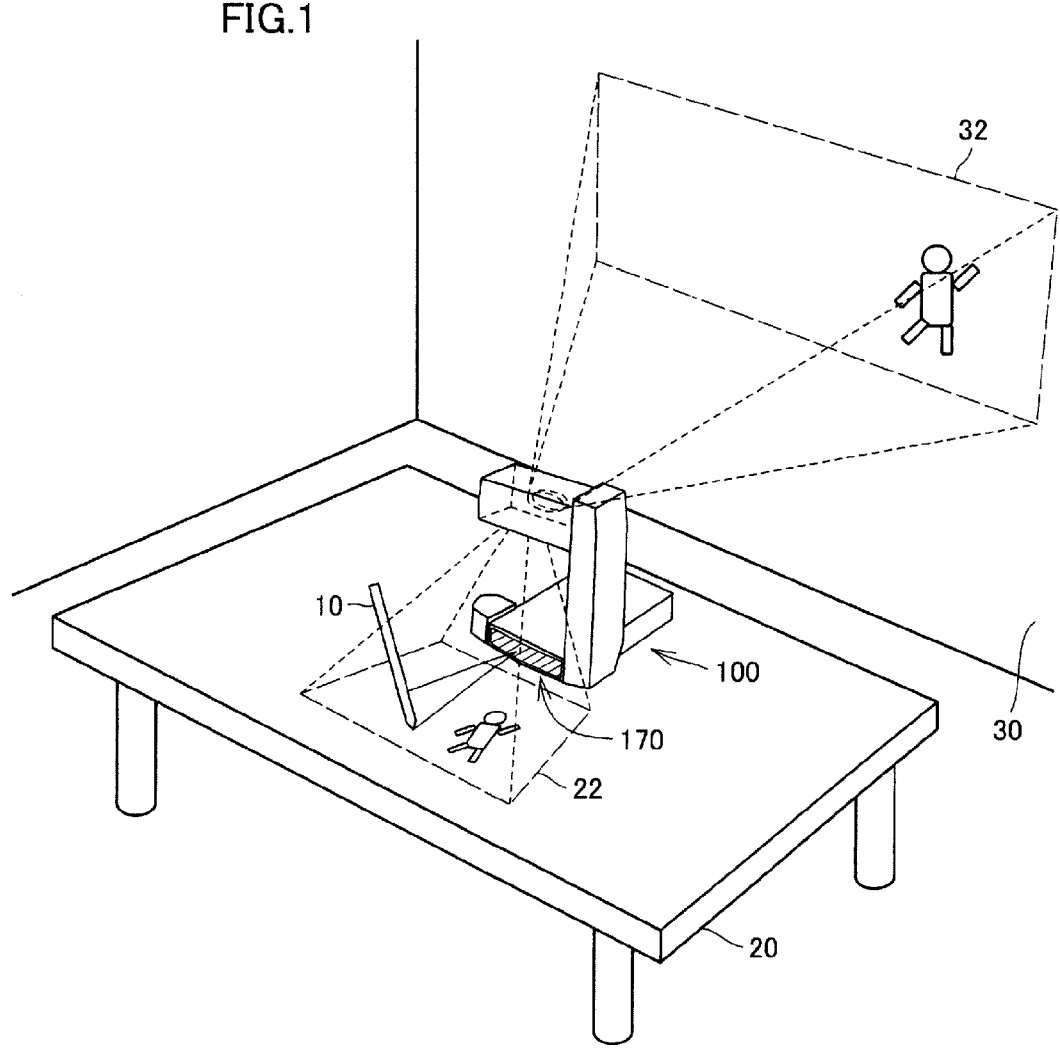
FIG. 1 shows a manner of use of a projector according to a first embodiment.

Referring to FIG. 1, description will be given on a form of use of a projector 100 according to an embodiment of the invention.

Projector 100 is used on a desk 20. Projector 100 projects a VUI (Virtual User Interface) screen picture 22 in a first direction. Also, projector 100 projects a main projection screen picture 32 in a second direction different from the first direction.

Main projection screen picture 32 is usually projected such that many persons can see it. In FIG. 1, projector 100 projects main projection screen picture 32 onto a wall 30. However, wall 30 is merely an example of a projection target plane onto which main projection screen picture 32 is projected. Wall 30 may be replaced with a screen member or the like.

VUI screen picture 22 is a screen picture to be referred to by the user. VUI screen picture 22 is usually projected near projector 100. In FIG. 1, projector 100 projects VUI screen picture 22 onto desk 20.

Projector 100 splits a single image by an optical element (not shown in FIG. 1) in projector 100 into VUI screen picture 22 and main projection screen picture 32. Therefore, VUI screen picture 22 is basically the same as main projection screen picture 32 except for a magnification. Usually, projector 100 is designed to provide VUI screen picture 22 smaller in size than main projection screen picture 32.

Projector 100 includes a light receiving element 170 for sensing light. Light receiving element 170 is arranged in a position where it receives the light emitted toward desk 20 (i.e., projection target plane of VUI screen picture 22) and reflected or scattered by an object 10 near desk 20. In FIG. 1, object 10 is a pen, but is not restricted to it. For example, object 10 may be a finger of the user. However, it is preferable that object 10 can scatter the light emitted from projector 100 so that light receiving element 170 can sense the light.

In this embodiment, light receiving element 170 is a photodiode. However, a CCD (Charge Coupled Device) sensor, a CMOS (Complementary Metal Oxide Semiconductor) sensor or the like may be used instead of the photodiode sensor.

Projector 100 calculates the position of object 10 based on the result of detection by light receiving element 170. Based on the calculated position of object 10, projector 100 controls the display of both VUI screen picture 22 and main projection screen picture 32 (which may be collectively referred to as "projected screen picture" hereinafter). The user can provide an instruction to VUI screen picture 22 through object 10 so that the user can move a pointer on the projected screen picture, and can change displayed details (pages of displayed slides) of the projected screen picture. The user can use VUI screen picture 22 located near the user to change main projection screen picture 32 of the same details as VUI screen picture 22. Therefore, the user can easily and intuitively perform the operation on main projection screen picture 32.

The form and size of projector 100 are not restricted to those shown in FIG. 1. For example, projector 100 may be a mobile projector of sizes that allow carrying thereof, or may be a stationary projector.

<Hardware Structure>

Figure 2:
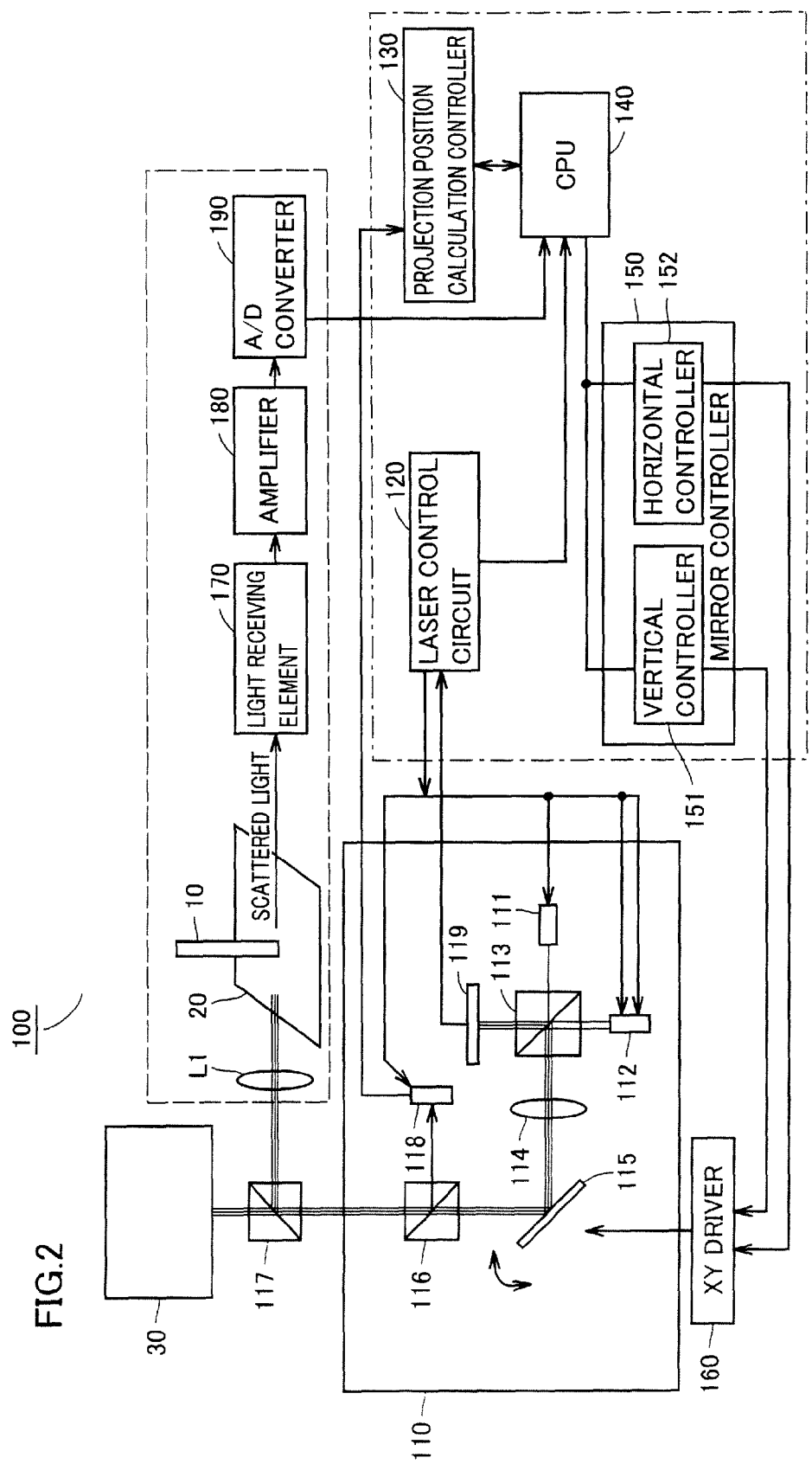
FIG. 2 shows a major hardware structure of the projector.

Referring to FIG. 2, the hardware structure of projector 100 will now be described.

Projector 100 is a so-called laser projector that emits laser light to the projection target plane for displaying an image on the projection target plane. Projector 100 includes an optical system 110, a laser control circuit 120, a projection position calculation controller 130, a CPU (Central Processing Unit) 140, a mirror controller 150, an XY driver 160, a light receiving element 170, an amplifier 180 and an A/D converter 190.

Optical system 110 includes a green laser 111, a two-color laser 112, a first beam splitter 113, a collimate lens 114, a scan mirror 115, second and third beam splitters 116 and 117, a lens L1, a photosensor 118 and a laser power sensor 119.

Green laser 111 emits green laser light. When a laser that can oscillate the green laser light is not available, a combination of a red laser emitting red laser light and an SHG (Second-Harmonic Generation) element may be used as green laser 111.

Two-color laser 112 emits red laser light and blue laser light. A package of two-color laser 112 contains a red laser chip oscillating the red laser light and a blue laser chip oscillating the blue laser light.

The use of two-color laser 112 can reduce the number of parts and the sizes of optical system 110, as compared with the use of the red laser and the blue laser that are independent of each other. However, two-color laser 112 may not withstand the use, or is not appropriately available for commercial use in view of costs and the like. In this case, the red laser and the blue laser that are independent of each other may be used instead of two-color laser 112.

First beam splitter 113 overlays a path of the green laser light on a path of the red laser light and green laser light, and provides them to collimate lens 114. Further, first beam splitter 113 provides a part of the laser light of each color to laser power sensor 119. A reflectivity (or transmissibility) of the light of first beam splitter 113 is preferably set such that the light is provided to collimate lens 114 as much as possible within a range that allows laser power sensor 119 to measure the laser power. First beam splitter 113 is an example of a combining element that combines the paths of the laser light, and first beam splitter 113 may be replaced with another optical element.

Collimate lens 114 collimates the light passed through first beam splitter 113.

A scan mirror 115 receives a drive signal, scans the laser light and selectively projects each picture element of an image to be displayed onto the projection target plane. In this embodiment, scan mirror 115 is a resonance MEMS (Micro-Electron Mechanical system) performing the scan in X-Y directions. The resonance MEMS mirror has advantages of small sizes, low power consumption and low manufacturing cost. However, scan mirror 115 is not restricted to the resonance MEMS mirror. For example, another type of resonance scan mirror, DMD (Digital Micromirror Device), a biaxial galvano-mirror or the like may be used as scan minor 115.

In this embodiment, scan mirror 115 two-dimensionally scans the laser light. Scan mirror 115 may be of the biaxial type. Alternatively, a combination of two uniaxial scan mirrors may be used as scan mirror 115.

Scan mirror 115 scans the laser light a frame of the image at a time, i.e., on a frame-by-frame basis. During the one frame, scan mirror 115 changes the number of times and the scan position according to the picture elements of the image. Scan mirror 115 repeats this series of changes of the scan position for every frame.

Second beam splitter 116 splits the laser light scanned by scan mirror 115 into two laser light beams that travel in different directions, respectively. One of the laser light beams coming from second beam splitter 116 enters third beam splitter 117. The other laser light beam coming from second beam splitter 116 enters photosensor 118.

Specifically, the laser light passed through second beam splitter 116 enters third beam splitter 117. The laser light reflected by second beam splitter 116 enters photosensor 118. Preferably, second beam splitter 116 has as low a reflectivity as possible for projecting as large an amount of light as possible onto each projection target plane within a range that allows sensing of the reflected light by photosensor 118. A relationship between the passed light and the reflected light may be opposite to that described above.

Third beam splitter 117 splits the laser light coming from second beam splitter 116 into laser light traveling to desk 20 (projection target plane of VUI screen picture 22) and wall 30 (projection target plane of main projection screen picture 32). In this embodiment, third beam splitter 117 is a half-transparent mirror having a light transmissibility of 50%. Therefore, main projection screen picture 32 and VUI screen picture 22 exhibit substantially the same brightness. However, the light transmissibility of third beam splitter 117 is not restricted to 50%.

Photosensor 118 senses the light incident on a sensing plane of photosensor 118. A result of the sensing by photosensor 118 is used for sensing a deflection angle (or a projection range of an image on each projection target plane) of scan mirror 115. The result of such sensing is also used for confirming the timing according to which the laser light is emitted for the image projection.

However, another method may be used for sensing the deflection angle of scan mirror 115 and the emission timing. For example, a sensor for sensing the signal of scan mirror 115 itself may be used. For example, a method that senses a counter electromotive force of the resonance MEMS mirror of the electromagnetic induction type or a piezo-signal of the resonance MEMS mirror of the capacitance type may be employed.

For using photosensor 118, photosensor 118 must be arranged behind scan mirror 115 so that photosensor 118 must have a sensing plane of a large size. Conversely, the method for sensing the signal of scan mirror 115 itself does not require photosensor 118, and therefore can reduce the sizes of projector 100. Also, this method can reduce the manufacturing cost of projector 100.

Even in the structure that uses the sensor sensing the signal of scan mirror 115 itself, photosensor 118 may be arranged in the same position for using it as an APC (Auto-Power Control). This photosensor for the APC may be arranged in the position where it can sense the light before it reaches scan mirror 115.

Laser power sensor 119 measures the intensity of the light incoming from first beam splitter 113. A result of the sensing by laser power sensor 119 is used for controlling the intensities of the laser light emitted from green laser 111 and two-color laser 112.

The structure of optical system 110 is not restricted to the above. Optical system 110 is merely required to include a plurality of optical elements that are arranged to emit the scanned laser light to each projection target plane.

Laser control circuit 120 controls green laser 111 and two-color laser 112 based on a result of the sensing by laser power sensor 119. Specifically, laser control circuit 120 controls drive currents and the like of green laser 111 and two-color laser 112 so that green laser 111 and two-color laser 112 emit the laser light of designated intensities according to predetermined timing.

Projection position calculation controller 130 senses a projection position of the image (i.e., a travel direction of the light scanned by scan mirror 115) based on a result of the sensing by photosensor 118. Specifically, projection position calculation controller 130 senses the projection position of the image based on a specified value of the output timing of the laser light as well as the laser light sensing timing of photosensor 118. The sensed projection position is used for sensing abnormality in scanning.

CPU 140 controls the operations of laser control circuit 120, projection position calculation controller 130 and mirror controller 150. For example, CPU 140 transmits image signals corresponding to the projection image to laser control circuit 120. CPU 140 provides a result (projection position) of the sensing by projection position calculation controller 130 to mirror controller 150.

Mirror controller 150 produces the drive signal of XY driver 160. The drive signal specifies the drive frequency and drive waveform of scan mirror 115. Specifically, mirror controller 150 includes a vertical controller 151 and a horizontal controller 152. Vertical controller 151 produces the drive signal for the Y direction. Horizontal controller 152 produces the drive signal for the X direction.

Particularly, mirror controller 150 changes the drive signals of XY driver 160 according to the changes in projection position sensed by photosensor 118. More specifically, mirror controller 150 receives the signal corresponding to the projection position from CPU 140, and produces the drive signal for XY driver 160 based on the received signal.

XY driver 160 causes scan mirror 115 to perform the scan operation according to the drive signal provided from mirror controller 150. Specifically, XY driver 160 produces a current of a waveform corresponding to the drive signal for scan mirror 115 (resonance MEMS mirror), and provides the produced current to scan mirror 115.

More specifically, XY driver 160 produces a rectangular pulse wave for horizontal driving (fast driving) and a DC waveform for vertical driving based on a control instruction about the drive frequency or an instruction for producing or switching the wave pattern that is provided from mirror controller 150.

In the horizontal direction, XY driver 160 performs resonance driving of scan mirror 115 by the rectangular wave. The resonance driving can move scan mirror 115 at a high speed with a small current. XY driver 160 drives scan mirror 115 by pulses matching with a peculiar resonance frequency of scan mirror 115.

In the vertical direction, XY driver 160 performs low-speed DC driving of scan mirror 115. The low-speed DC driving can control scan mirror 115 to keep a desired position by a current. During a projection period of the frame of the projection image, the vertical drive waveform repeats a current pattern in which the current gradually decreases or increases with time. The vertical drive frequency defines a frame rate.

A horizontal resolution of projector 100 is determined by the number of times which the laser emits the laser light in one horizontal scan period. Therefore, the horizontal resolution of projector 100 depends on the resonance frequency of scan mirror 115 and the laser emission frequency.

The vertical resolution of projector 100 is determined by the vertical drive waveform. Specifically, a ratio at which a time length of the waveform in the projection direction (advancing or returning path of the scan) occupies in one cycle of the vertical drive waveform is set so that scan mirror 115 can scan the lines corresponding to the vertical resolution during one vertical reciprocation.

The resolution of projector 100 also depends on the scanning mode. Specifically, the resolution of projector 100 varies depending on whether the scanning mode is a progressive mode or an interlace mode.

The scanning mode depends on a relationship between the output period of the laser light and the period of the advancing or returning of the scan. In this embodiment, scan mirror 115 scans the light from the upper side to the lower side of the frame. Thus, the laser emits the laser light during the advancing period. However, the scanning direction is not restricted to the above. For example, the laser may output the laser light during the returning period, whereby the scan direction is inverted to the direction from the lower side to the upper side. When the laser emits the laser light during both the advancing period and the returning period, the light is scanned bidirectionally.

The low-speed (vertical) mirror likewise has a resonance frequency. Therefore, vertical controller 151 removes, in analog and digital fashions, harmonics of the drive frequency in the vertical direction so that the harmonics may not interfere with the resonance frequency component. XY driver 160 may perform this filtering processing.

Light receiving element 170 senses the incoming light, and provides a sense signal corresponding to the sensing of the light to amplifier 180. As already stated, light receiving element 170 senses the light scattered by object 10 on desk 20.

Amplifier 180 amplifies the sense signal provided from light receiving element 170, and provides the amplified sense signal to A/D converter 190. A/D converter 190 converts the signal received from amplifier 180 to a digital signal, and provides it to CPU 140.

Figure 3:
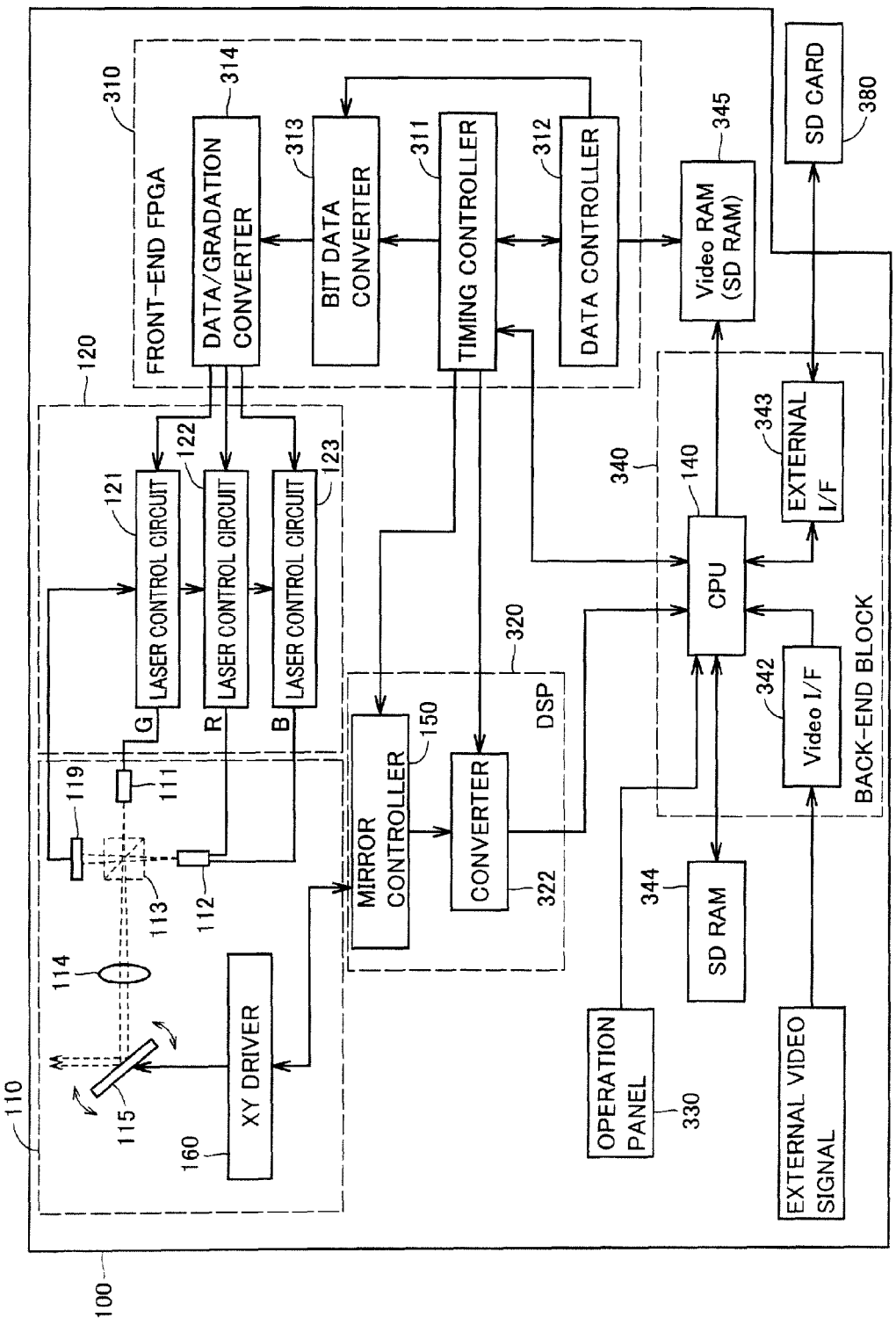
FIG. 3 specifically shows the hardware structure of the projector.

Referring to FIG. 3, the structure of projector 100 will be described below more in detail. FIG. 3 does not repeat description of the components (light receiving element 170, amplifier 180 and others) already shown in FIG. 2.

Projector 100 includes optical system 110, laser control circuit 120, a front-end FPGA (Field Programmable Gate Array) 310, a digital signal processor 320, an operation panel 330, a back-end block 340, an SDRAM (Synchronous Dynamic Random Access Memory) 344 and a video RAM 345.

Operation panel 330 is arranged on the front or side surface of the casing of projector 100. For example, operation panel 330 includes a display device (not shown) for displaying details of the operation as well as switches (plus/minus buttons) for accepting the operation input to projector. When operation panel 330 accepts the operations, it transmits a signal corresponding to the accepted operation to CPU 140 contained in back-end block 340.

Back-end block 340 includes CPU 140, a video interface 342 and an external interface 343.

Video interface 342 accepts image signals (external video signals) externally provided to projector 100. Video interface 342 is connected to a personal computer or the like.

External interface 343 can accept an SD card 380. External interface 343 can read data from SD card 380. CPU 140 stores the read data in SDRAM 344 or video RAM 345. External interface 343 may be configured to handle a recording medium other than SD card 380.

CPU 140 controls the projection of the image based on the signal that is entered to projector 100 through video interface 342 or external interface 343 according to the operation input provided to operation panel 330. More specifically, CPU 140 stores the image data based on the entered signal in video RAM 345. CPU 140 controls a timing controller 311 in front-end FPGA 310 to control the projection of the image based on the image data in video RAM 345.

Front-end FPGA 310 includes a data/gradation converter 314, timing controller 311, a data controller 312 and a bit data converter 313.

Timing controller 311 reads image data held in video RAM 345 through data controller 312 based on an instruction provided from CPU 140. Timing controller 311 also controls digital signal processor 320.

Data controller 312 transmits the image data read from video RAM 345 to bit data converter 313.

Based on an instruction provided from timing controller 311, bit data converter 313 converts the image data to data of a form that is suitable for projection by laser emission. Also, bit data converter 313 transmits the converted image data to data/gradation converter 314.

Data/gradation converter 314 converts the data provided from bit data converter 313 to color gradation data for display in three colors of G (Green), R (Red) and B (Blue). Data/gradation converter 314 transmits the converted data to laser control circuit 120.

Although not shown specifically in FIG. 1, laser control circuit 120 includes green, red and blue laser control circuits 121, 22 and 123. Green laser control circuit 121 controls the output timing and intensity of the laser light emitted from green laser 111. Specifically, green laser control circuit 121 regulates the intensity of the green laser light by regulating, e.g., a drive current provided to green laser 111. Red and blue laser control circuits 122 and 123 operate similarly to green laser control circuit 121.

Digital signal processor 320 includes mirror controller 150 and a converter 322.

Mirror controller 150 controls the operation of scan mirror 115 based on the instruction provided from timing controller 311. Specifically, mirror controller 150 produces, based on an instruction, a drive signal for driving XY driver 160. XY driver 160 controls the operation of scan mirror 115 based on the drive signal to scan the laser light.

Converter 322 transfers the signal received from mirror controller 150 to CPU 140. For example, converter 322 produces a signal including a drive signal for XY driver 160 and a state of XY driver 160, and transmits the produced signals to CPU 140. CPU 140 determines based on this signal whether a scan abnormality is present or not. When the abnormality is present, CPU 140 interrupts the image projection.

<Functional Structure>

Figure 4:
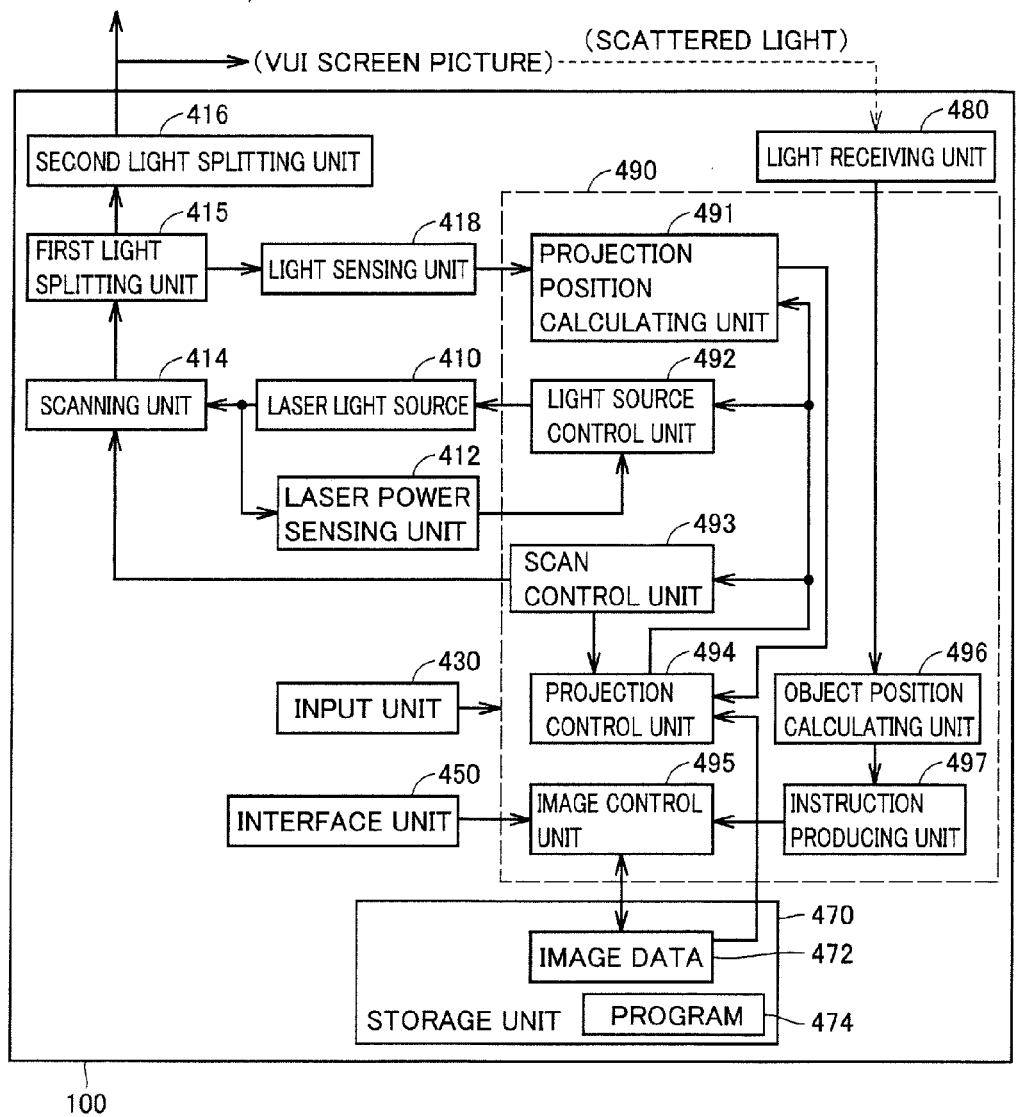
FIG. 4 shows a functional structure of the projector.

Referring to FIG. 4, a functional structure of projector 100 will now be described.

Projector 100 includes a laser light source 410, a laser power sensing unit 412, a scanning unit 414, first and second light splitting units 415 and 416, a light sensing unit 418, an input unit 430, an interface unit 450, a storage unit 470, a light receiving unit 480 and a control unit 490.

Laser light source 410 emits the laser light. In this embodiment, laser light source 410 emits the laser light of three colors of RGB. Green laser 111, two-color laser 112 and first beam splitter 113 correspond to laser light source 410.

Laser power sensing unit 412 senses the intensity of the laser light emitted from laser light source 410. First beam splitter 113 and laser power sensor 119 correspond to laser power sensing unit 412.

Scanning unit 414 scans the laser light emitted from laser light source 410. Scan mirror 115 and XY driver 160 correspond to scanning unit 414.

First light splitting unit 415 splits the scanned laser light into laser light traveling to light sensing unit 418 and laser light traveling to second light splitting unit 416. Second beam splitter 116 corresponds to first light splitting unit 415.

Second light splitting unit 416 splits the laser light from first light splitting unit 415 into laser light traveling to the projection target plane (wall 30) of the main projection screen picture and laser light traveling to the projection target plane (desk 20) of the VUI screen picture. Third beam splitter 117 corresponds to second light splitting unit 416.

Light sensing unit 418 senses a part of the scanned laser light. A result of the sensing by light sensing unit 418 is used for calculating the scan position. Photosensor 118 corresponds to light sensing unit 418.

Input unit 430 accepts an instruction externally provided to projector 100. Input unit 430 transmits the accepted instruction to control unit 490. Operation panel 330 corresponds to input unit 430. Although projector 100 also deems the input to the VUI screen picture as an instruction, input unit 430 in this example does not contain a portion relating to the input to the VUI screen picture.

Interface unit 450 externally exchanges the data. Video interface 342 and external interface 343 correspond to interface unit 450.

Storage unit 470 stores the data. Specifically, storage unit 470 stores image data 472 and a program 474. The data stored in storage unit 470 is not restricted to the above. SDRAM 344 and video RAM 345 correspond to storage unit 470.

Image data 472 is a base of the projection image projected by projector 100. For example, image data 472 is data that projector 100 reads from an external memory device, or an external video signal. Also, image data 472 may be produced by effecting predetermined processing on these kinds of data.

Program 474 is employed for performing the image processing on image data 472.

Light receiving unit 480 senses the light scattered by object 10 on desk 20. Light receiving element 170 corresponds to light receiving unit 480.

Control unit 490 controls the operations of storage unit 470, laser light source 410 and scanning unit 414 based on results of sensing of laser power sensing unit 412, light sensing unit 418 and light receiving unit 480 as well as the instruction accepted by input unit 430. Control unit 490 includes a projection position calculating unit 491, a light source control unit 492, a scan control unit 493, a projection control unit 494, an image processing unit 495, an object position calculating unit 496 and an instruction producing unit 497.

Projection position calculating unit 491 calculates the projection position based on the result of sensing of light sensing unit 418. Projection position calculating unit 491 transmits the calculated projection position to projection control unit 494. Projection position calculation controller 130 corresponds to projection position calculating unit 491.

Based on the result of sensing of laser power sensing unit 412 and the signal from projection control unit 494, light source control unit 492 controls the output of the laser light from laser light source 410. Specifically, light source control unit 492 controls the output timing and the intensity of the laser light of each color. Laser control circuit 120 corresponds to light source control unit 492.

Scan control unit 493 controls the operation of scanning unit 414 based on the signal provided from projection control unit 494. Scan control unit 493 operates scanning unit 414 with a predetermined scan frequency. Also, scan control unit 493 transmits the signal including the operation state of scanning unit 414 and the like to projection control unit 494. Digital signal processor 320 corresponds to scan control unit 493.

Projection control unit 494 controls the operation of light source control unit 492 and scan control unit 493 for projecting the image. CPU 140, timing controller 311 and data controller 312 correspond to projection control unit 494.

Specifically, projection control unit 494 reads image data 472 from storage unit 470. Projection control unit 494 produces the control signal to be provided to light source control unit 492 based on image data 472 thus read and the specified value of the scan frequency of scan mirror 115. Projection control unit 494 transmits the control signal thus produced to light source control unit 492.

Projection control unit 494 provides instructions for starting and ending the scanning to scan control unit 493 based on the specified scan period and the operation state of scanning unit 414.

Image processing unit 495 stores the image data accepted by interface unit 450 in storage unit 470. Also, image processing unit 495 executes program 474 based on the instruction accepted by input unit 430 or an instruction that is produced by instruction producing unit 497 according to the input to VUI screen picture 22 as will be described later, and thereby executes predetermined processing on image data 472.

For example, image processing unit 495 performs size-changing processing or turning processing on image data 472 stored in storage unit 470, and stores the data thus processed in storage unit 470. Alternatively, image processing unit 495 stores, in storage unit 470, the data produced by adding display data corresponding to a pointer corresponding to an input position to image data 472.

When image data 472 includes a plurality of image page data items, image processing unit 495 determines the image page data item in image data 472 for projection. Image processing unit 495 selects the page data item to be selected based on an external instruction accepted by input unit 430 or an instruction produced by instruction producing unit 497.

Object position calculating unit 496 calculates the instruction position on the VUI screen picture where object 10 applies the instruction, based on a result of the sensing by light receiving unit 480, i.e., a result of the sensing of the light scattered by object 10. The calculation of the instruction position based on the result of sensing by light receiving unit 480 will be described later in detail.

Instruction producing unit 497 produces the instruction for changing the projection image, based on the instruction position calculated by object position calculating unit 496. Specifically, instruction producing unit 497 produces the instruction to be applied to image processing unit 495 for executing the image processing. When image data 472 contains a plurality of page data items, instruction producing unit 497 may send an instruction for changing the page to be projected to image processing unit 495.

The function of control unit 490 described above is implemented by projection position calculation controller 130, CPU 140 executing program 474, front-end FPGA 310, digital signal processor 320 and laser control circuit 120. However, the structure for implementing the functions of control unit 490 is not restricted to the above. The functions of control unit 490 may be partially or entirely implemented by hardware such as a dedicated circuit, or may be implemented by a processor that executes a program using a RAM or the like as a working memory.

<Method of Calculating the Position of the External Object>

Figure 5:
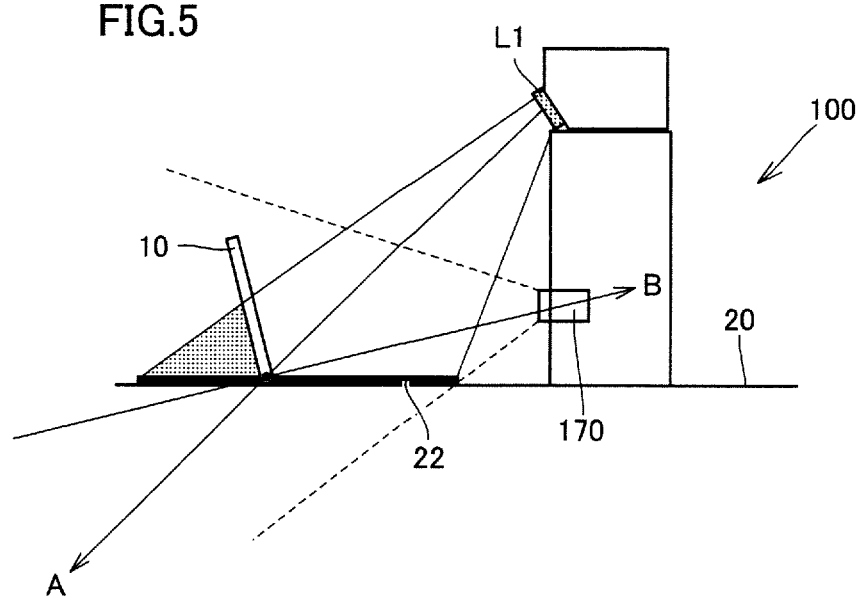
FIG. 5 shows light paths relating to position determination of an object on a VUI screen picture.

Referring to FIG. 5, processing of specifying the position of object 10 on VUI screen picture 22 will be described below in detail.

Projector 100 projects VUI screen picture 22 onto desk 20 through lens L1. Projector 100 selectively outputs the laser light for each picture element of the projection image. Specifically, projector 100 outputs the laser light having the color and intensity corresponding to one picture element in each of the plurality of periods called "scan steps". Projector 100 scans the laser light in each scan step, and outputs the laser light in the direction corresponding to the picture element. FIG. 5 shows a light path A where the light emitted from projector 100 travels straight without being reflected by object 10 or desk 20 in a certain scan step.

When object 10 is placed on VUI screen picture 22, object 10 scatters the laser light projected from projector 100 toward VUI screen picture 22. The scattered laser light changes its light path, and enters light receiving element 170. FIG. 5 shows a light path B of the light that is scattered by object 10 after it traveled along light path A. Although light path B is shown by a single line, light path B practically diverges to a certain extent due variations in scattering angle.

In FIG. 5, object 10 is in contact with VUI screen picture 22. However, light receiving element 170 can sense the light scattered by object 10 that is located near VUI screen picture 22. Thus, the description that object 10 is placed on VUI screen picture 22 includes not only the case where object 10 is in contact with VUI screen picture 22 but also the case where object 10 is located near VUI screen picture 22.

A sensing plane of light receiving element 170 is located between lower and upper limit levels or heights from the bottom surface of projector 100 (i.e., the installation surface on desk 20). The lower and upper limit levels are preferably designed such that the sensing plane can receive the light scattered by object 10 located on or near the surface of VUI screen picture 22, and does not receive the light scattered by object 10 remote from VUI screen picture 22 as far as possible. The lower and upper limit levels can be determined based on the positional relationship between projector 100 and VUI screen picture 22, the shape of object 10 or the like, or based on experiments.

Figure 6:
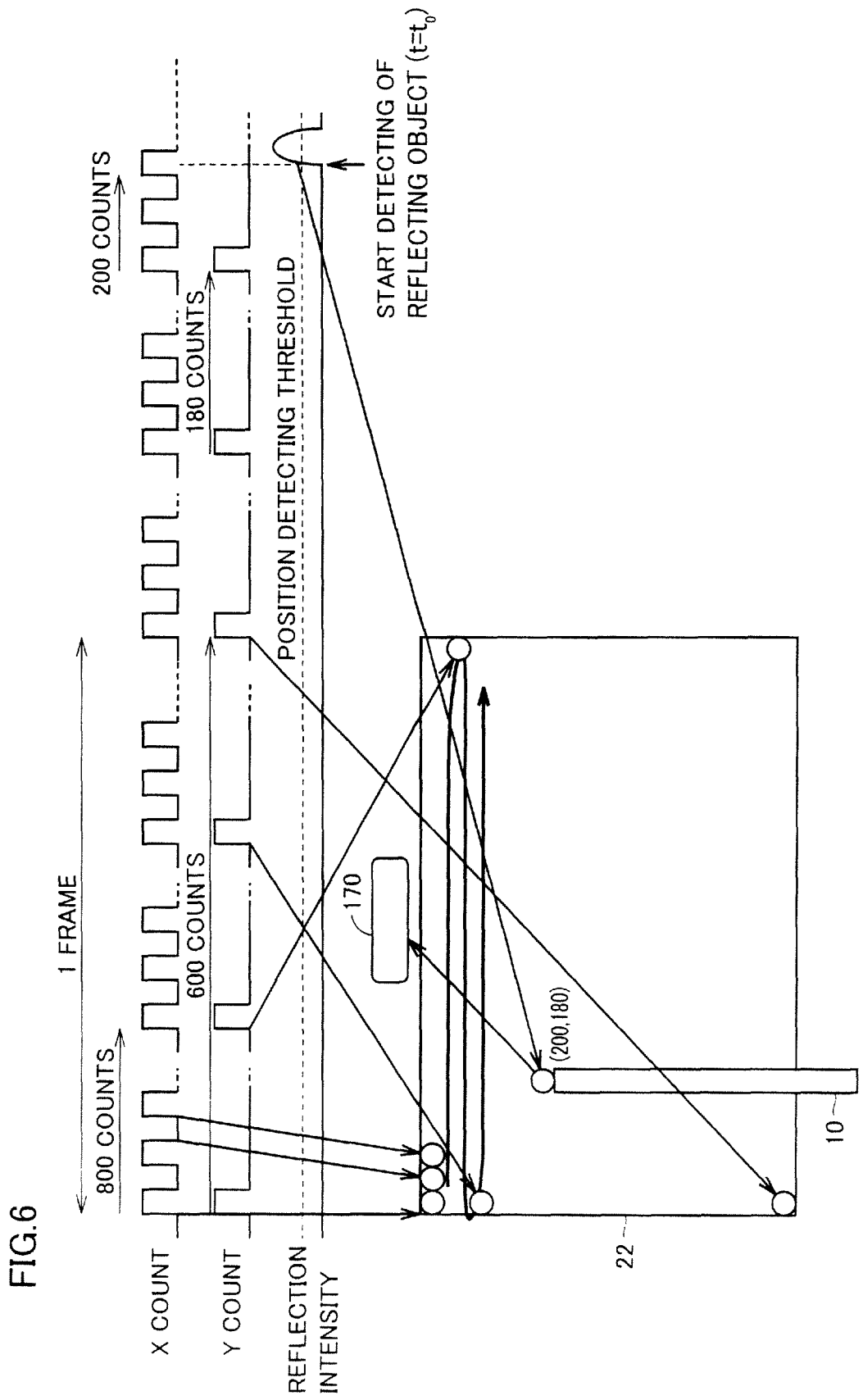
FIG. 6 illustrates determination of a contact position based on detection timing of scattered light.

Referring to FIG. 6, projector 100 determines the contact position of object 10 on VUI screen picture 22 according to the sensing timing of the scattered light as described below.

The abscissas in three graphs shown in FIG. 6 give the time, and the ordinates in the three, i.e., upper, middle and lower graphs represent an X count, a Y count and a sensing signal (reflection intensity) of light receiving element 170, respectively. FIG. 6 also shows in its lower portion a manner of the light scanning on VUI screen picture 22. It is assumed that the image has a resolution of (800×600) picture elements.

The X count corresponds to the number of times that scan mirror 115 reciprocates in the X direction (horizontal direction). CPU 140 increases the X count at predetermined time intervals corresponding to the laser emission frequency. Raised portions of the graph in the figure correspond to the timing according to which CPU 140 increases the X count. CPU 140 stores the X count in the memory.

CPU 140 controls the X count and the laser light emission position in a linked fashion. Thus, according to specific synchronization timing, CPU 140 causes, through laser control circuit 120, green laser 111 and two-color laser 112 to start the emission of the laser light with a predetermined frequency. This synchronization timing depends on the light sensing signal, piezo-signal or a specific position in a vertical drive waveform of mirror controller 150. CPU 140 starts producing the X count signal according to this synchronization timing. When the X count reaches 800, the picture element projection in an advancing path of one horizontal line ends. Thereafter, the picture element projection in the returning or advancing path will end every time the X count increases by 800.

The Y count is used for counting the number of times which scan mirror 115 reciprocates in the Y direction (vertical direction). CPU 140 increases the Y count signal by one every time X count increases by 800 (the horizontal resolution). CPU 140 stores the Y count in the memory. When Y count reaches 600, the projection of one frame of the image ends.

The state in which object 10 is in contact with the picture element position (200, 180) in VUI screen picture 22. In this state, when the X count increases by 200 after the Y count increased by 180 from the start of the frame, light receiving element 170 outputs the sense signal corresponding to the scattered light.

CPU 140 obtains the scan position (light travel direction) according to the generation timing of the sense signal based on the control signal provided to scan mirror 115 and the projection position that is calculated based on a result of the sensing by light sensing unit 418. CPU 140 determines that the scan position (200, 180) that corresponds to the generation timing of the sense signal is the contact position of object 10.

In this embodiment, CPU 140 determines the position of object 10 based on the sense signal that exceeds a predetermined threshold (position sensing threshold). The purpose of doing this is to suppress the influence of the light incident on light receiving element 170 other than the scattered light.

<Image Change by VUI>

Projector 100 controls the projected screen picture based on the position of object 10 that is calculated by the foregoing method. More specifically, projector 100 changes the projected screen picture when it determines that object 10 is in contact with a plurality of portions of VUI screen picture 22, and at least one of the contact positions moves.

Simply, it can be considered that projector 100 changes the projected screen picture according to appearance or disappearance of one contact position. Thus, it can be considered that projector 100 performs a so-called clicking operation. In this manner, however, projector 100 cannot respond immediately or instantaneously to the operation on VUI screen picture 22 without difficulty.

This is because projector 100 may sense the light scattered by object 10 remote from VUI screen picture 22 in addition to the light scattered by object 10 strictly in contact with VUI screen picture 22. The scattered light diverges to a certain extent. Also, the traveling direction of the scattered light changes depending on the angle of object 10. For these reasons, outputting of the sense signal continues while object 10 is located near VUI screen picture 22. Therefore, when the user move object 10 away from VUI screen picture 22, projector 100 does not instantaneously respond to the user's operation.

It may be envisaged to configure projector 100 such that projector 100 determines the issuance of the external instruction when the detection of the sense signal continues for a predetermined time or more. In this method, however, the user must hold object 10 in the user's hand for a certain time, which may apply stress to the user during the operation.

Accordingly, projector 100 changes the projected screen picture when it determines that object 10 simultaneously comes into contact with a plurality of portions of VUI screen picture 22 and at least one of the contact positions moves. Thereby, projector 100 can execute a predetermined action based on the input to VUI screen picture 22 without applying stress to the user. Also, projector 100 can implement various actions by performing the actions based on the plurality of sensed positions.

Projector 100 senses the position of object 10 according to the sensing timing of the reflected light and a comparison between the scan positions of the laser light at different points in time. Therefore, projector 100 can detect object 10 that simultaneously appear at multiple positions. Addition of special parts is not required for implementing the operation of the above virtual user interface. Projector 100 can implement various actions without using a special part.

Description will now be given on several examples of the operation of projector 100 according to the movement of the object on VUI screen picture 22.

(Icon Operation)

Projector 100 performs an action corresponding to an icon when one detected position (first detected position) is on an icon in VUI screen picture 22, and another detected position (second detected position) moves.

The "icon" represents an image that is displayed in a predetermined region for determining the operation instruction. Preferably, the icon is an image corresponding to the screen changing operation such as page turning. The user can perform the operation while viewing the icon on VUI screen picture 22 so that the user can intuitively operate projector 100.

However, projector 100 may be configured to perform additionally a similar operation when the first detected position is located in a predetermined region on VUI screen picture 22 other than the icon. For example, projector 100 may be configured to perform additionally the similar operation when the first detected position is in a predetermined region that is set on an end or corner of VUI screen picture 22.

In this embodiment, when a movement distance of the second detected position exceeds a predetermined threshold, projector 100 performs the operation corresponding to the icon. The purpose of doing this is to suppress an influence exerted by positional deviation of object 10 and error in detection.

(Switching of Projected Screen Picture)

Figure 7:
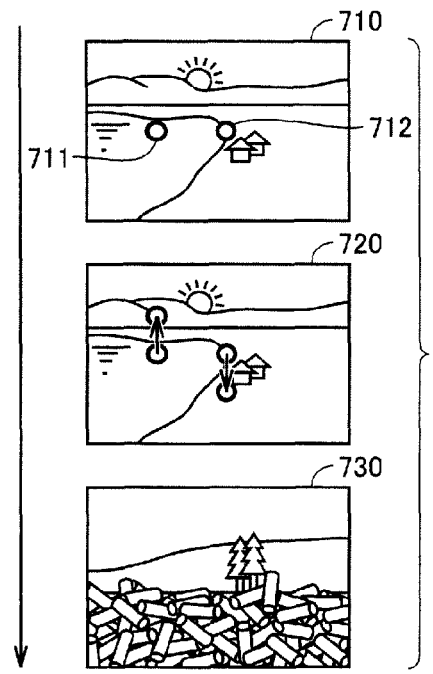
FIG. 7 illustrates an example of an operation of the projector based on the operation on the VUI screen picture.

When two detected positions move relatively to each other, projector 100 changes the projected screen picture. Referring to FIG. 7, switching of the projected screen picture will be described as an example of such change.

Screen picture 710 shows a state in which object 10 is detected at two positions on VUI screen picture 22. For the sake of illustration, the detected positions of object 10 in screen picture 710 are indicated by circles, respectively. In practice, projector 100 does not display the circles shown in FIG. 7A on VUI screen picture 22.

However, projector 100 may display the pointer corresponding to the detected position on VUI screen picture 22. In this case, projector 100 produces image data 472 by superimposing display data of the pointer corresponding to the detected position on image data 472.

A screen picture 720 shows a state in which the detected positions are moving from those in screen picture 710. The left detected position is moving upward, and the right detected position is moving downward. A screen picture 730 shows VUI screen picture 22 in which the detected positions have already moved. Projector 100 changes the page data to be displayed according to the movement of the detected positions, and thereby switches the projected screen picture.

Projector 100 may be configured to change the screen picture changing operation based on the kind of relative movement of the two detected positions. For example, projector 100 may operate to display a next page when the left detected position moves upward and the right detected position moves downward, and to display a previous page when the left detected position moves downward and the right detected position moves upward.

(Size Change)

Figure 8:
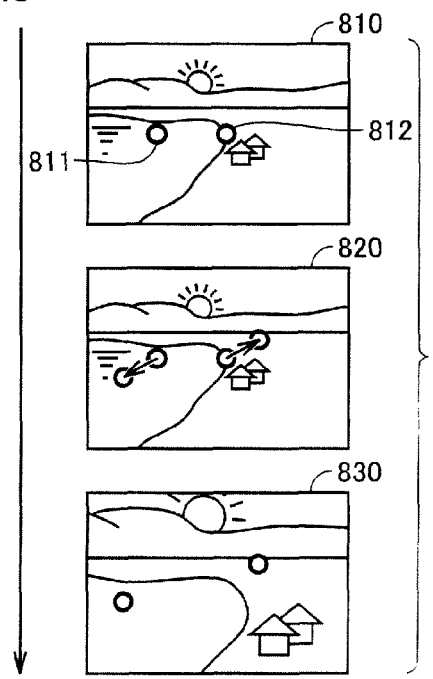
FIG. 8 illustrates another example of the operation of the projector based on the operation of the VUI screen picture.

Projector 100 may change the size (enlargement or reduction) of the projected screen picture depending on change in distance between the detected positions. Referring to FIG. 8, the size change will be described below.

A screen picture 810 shows a state in which object 10 is detected in two positions on VUI screen picture 22, respectively. In screen picture 810, the detected positions of object 10 are indicated by circles 811 and 812, respectively. These circles are shown for the sake of illustration, similarly to circles 711 and 712 shown in FIG. 7.

A screen picture 820 shows a state in which the detected positions are moving from those shown in screen picture 810. The two detected positions are moving move away from each other. Specifically, the left detected position is moving toward the lower left, and the right detected position is moving toward the upper right. A screen picture 830 shows VUI screen picture 22 in which the detected positions have already moved. Projector 100 enlarges the projected screen picture.

Projector 100 may perform image processing other that the two kinds of image processing already described on image data 472 to produce new image data 472. For example, projector 100 may perform rotation processing on image data 472 or scrolling of the image of image data 472 that cannot be fully projected at a time. The processing corresponding to the icon is not restricted to the page change already described. For example, when projector 100 projects a movie, it may perform fast forwarding, fast rewinding and stop of the movie according to selection of the icons.

(Flow of Processing>

Figure 9:
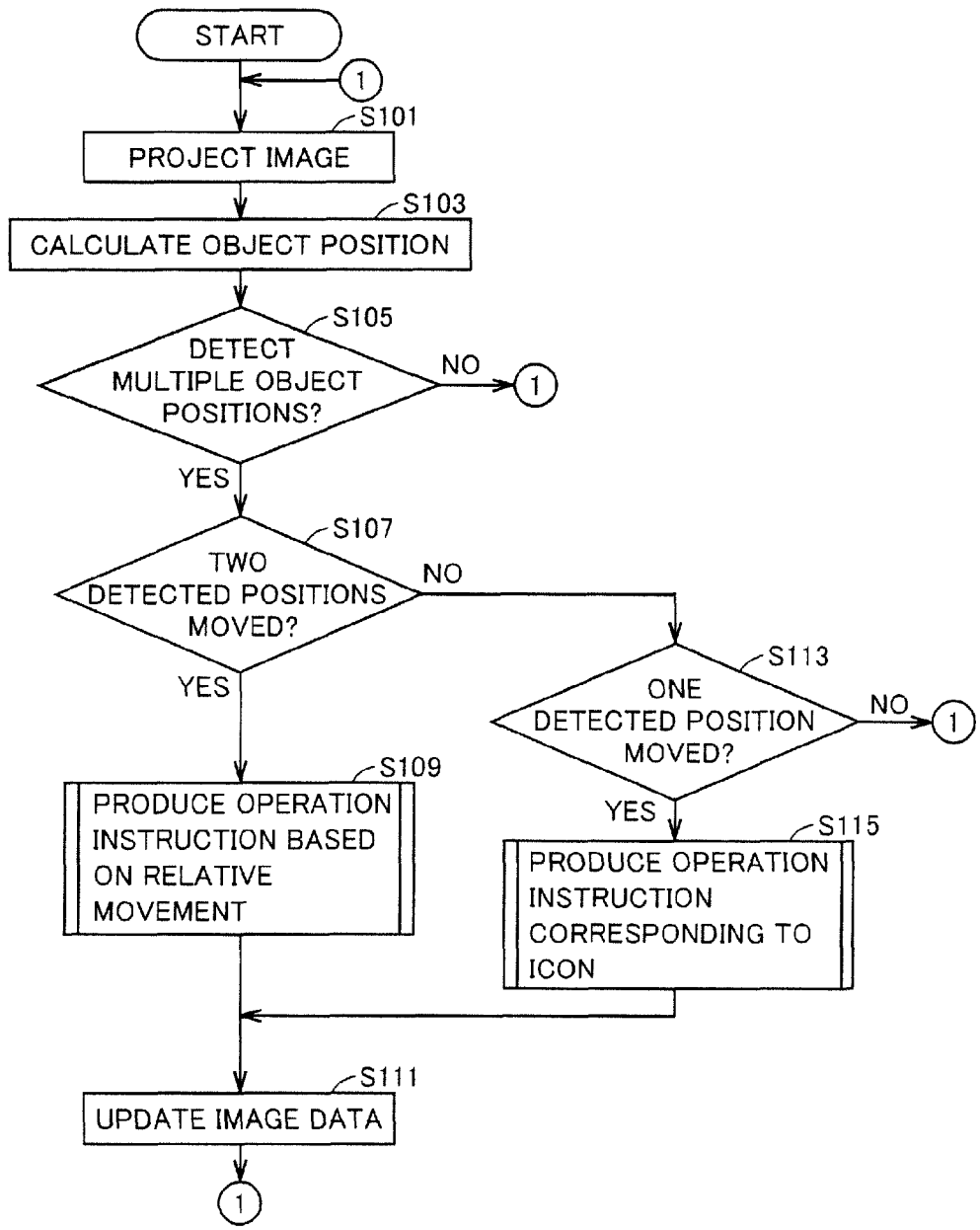
FIG. 9 shows in a flowchart form a flow of processing performed by the projector.

Referring to FIG. 9, description will be given on the flow of processing performed by projector 100.

In a step S101, projector 100 controls green laser 111, two-color laser 112 and scan mirror 115 to project the image based on the image data in two directions.

In a step S103, CPU 140 obtains the detected position of object 10 on VUI screen picture 22 based on a result of the light sensing by light receiving element 170. Specifically, CPU 140 obtains the detected position based on the timing according to which light receiving element 170 senses the light of a threshold or more as well as the scan positions at respective points in time.

In a step S105, CPU 140 determines whether object 10 is simultaneously in contact with a plurality of positions on VUI screen picture 22 or not (or is simultaneously located near VUI screen picture 22 or not). Specifically, CPU 140 determines whether a plurality of different detected positions are obtained within a scan period of one frame of the projected screen picture. CPU 140 may perform similar determination within a scan period of several frames instead of one frame. The determination period can be appropriately set within a range where it can be deemed that the plurality of detected positions correspond to the simultaneous contact of object 10 with the plurality of positions of VUI screen picture 22.

In a step S107, CPU 140 determines whether two detected positions have moved or not. Specifically, CPU 140 obtains an amount of movement of the detected position in the two successive frames. When the amount of movement exceeds a threshold, CPU 140 deems that the detected position has moved. CPU 140 determines the relationship or correspondence between the detected positions in the two frame based on a distance between the detected positions in the two frames. Thus, CPU 140 determines that the two detected positions spaced by a distance smaller than a threshold are the same detected position. This is based on the fact that the detected position has not move long in the successive frames.

When the two detected positions have moved (YES in step S107), CPU 140 determines the operation instruction based on the relative movement of the two detected positions in a step S109. The processing in step S109 will be described later in detail.

In a step S111 after step S109, CPU 140 updates image data 472 based on the operation instruction thus determined Thereafter, CPU 140 repeats the processing starting from step S101.

When the two detected positions have not moved (NO in step S107), CPU 140 determines whether one of the detected positions has moved or not in a step S113. CPU 140 performs this determination about the movement of the detected position in a manner similar to that in step S107 already described.

When one detected position has not moved (NO in step S113), CPU 140 repeats the processing starting from step S101. Therefore, when no detected position has moved, or when three or more detected positions have moved simultaneously, CPU 140 does not produce the operation instruction. However, operation rules corresponding to the movement of the three or more detected positions may be determined, whereby CPU 140 can produce the operation instruction in the above case.

When one detected position has moved (YES in step S113), CPU 140 determines the operation instruction corresponding to the icon in a step S115. The processing in step S115 will be described later in detail. After executing the processing in step S115, CPU 140 performs the processing in step S111 already described.

(Operation Instruction Based on Relative Movement)

Figure 10:
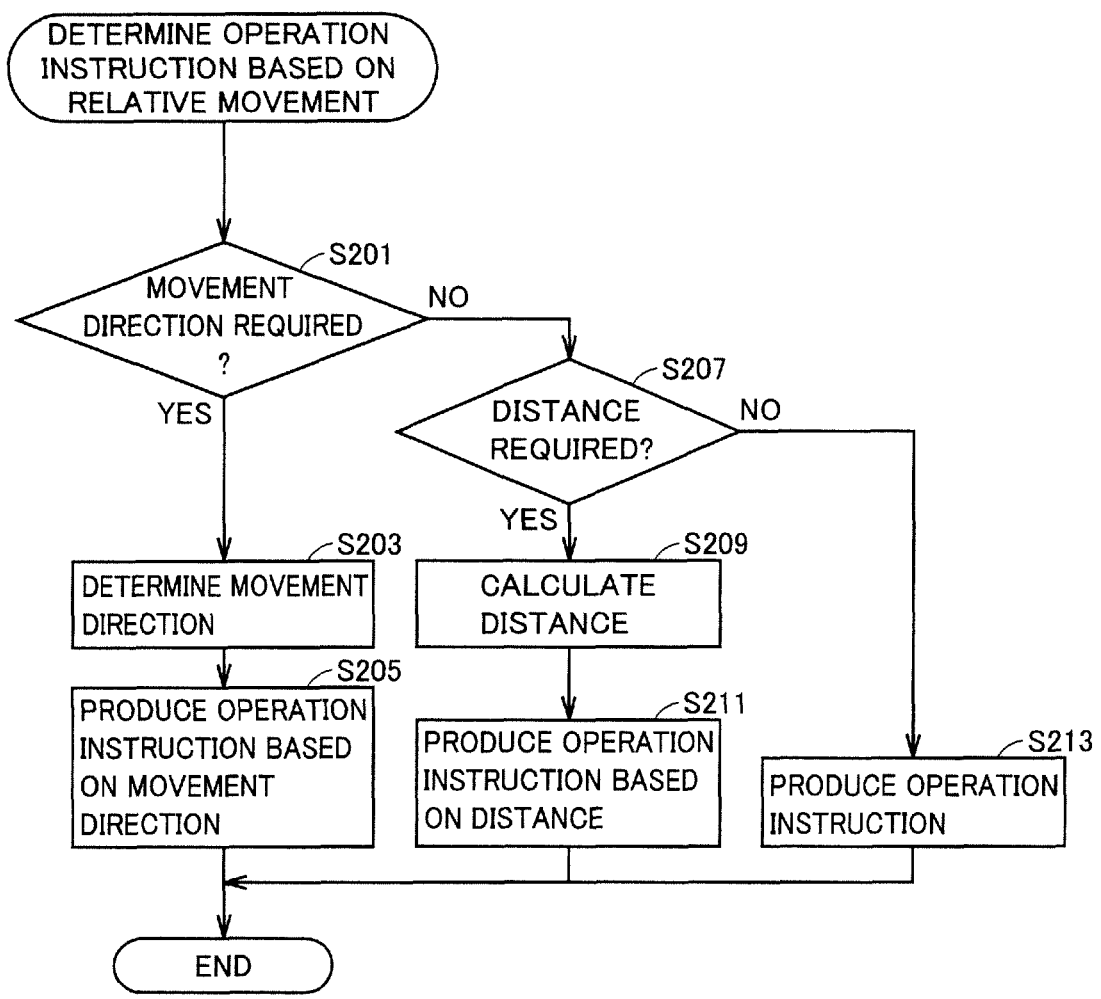
FIG. 10 shows in a flowchart form a flow of processing of determining operation instructions based on a relative movement.

Referring to FIG. 10, the processing in step S109 shown in FIG. 9 (i.e., determination of the operation instruction based on the relative movement) will be described below in detail.

In a step S201, CPU 140 determines whether the movement direction is required for determining the operation instruction or not. For example, CPU 140 determines based on the type of the program for producing the projected screen picture whether the movement direction is required for determining the operation instruction or not. Alternatively, projector 100 may store data that correlates the operation of object 10 on VUI screen picture 22 with the operation instruction. In this case, CPU 140 determines based on this data whether the movement direction is required for determining the operation instruction or not.

When the movement direction is required (YES in step S201), CPU 140 performs next processing in a step S203. In step S203, CPU 140 obtains the movement direction of the detected position. CPU 140 can obtain the movement direction with precision required for determining the operation instruction. For example, when it is required to determine the operation based on the vertical movement of the detected position, CPU 140 is merely required to calculate the quantity of vertical movement of the detected position.

After executing the processing in step S203, CPU 140 produces the operation instruction based on the movement direction in a step S205. In the above example, CPU 140 produces the operation instruction for switching the projected screen picture when one of the detected positions move upward and the other moves downward.

CPU 140 may be able to change the operation instruction produced thereby according to a pattern of the plurality of movement directions. This allows the user to operate projector 100 in various manners, using VUI screen picture 22.

When the movement direction is not required (NO in step S201), CPU 140 performs next processing in a step S207. In step S207, CPU 140 determines whether a distance between the detected positions is required for determining the operation instruction or not. In a manner similar to that in step S201 for determining whether the movement direction is required or not, CPU 140 determines whether the distance is required or not.

When the distance is required (YES in step S207), CPU 140 performs next processing in a step S209. In step S209, CPU 140 calculates the distance between the detected positions. CPU 140 calculates the distance between the detected positions in at least two frames.

After the execution of the processing in step S209, CPU 140 produces the operation instruction based on the distance. For example, CPU 140 produces the operation instruction for enlarging the projected screen picture when the distance increases. When the distance decreases, CPU 140 produces the operation instruction for reducing the projected screen picture. CPU 140 may change the enlarging or reducing rate based on the quantity or rate of change in distance.

When the distance is not required (NO in step S207), CPU 140 performs next processing in a step S213. In step S213, CPU 140 produces the operation instruction. The operation instruction thus produced corresponds to the fact that the two detected positions have moved, and does not depend on the change in movement direction or distance between the points.

(Operation Instruction with Icon)

Figure 11:
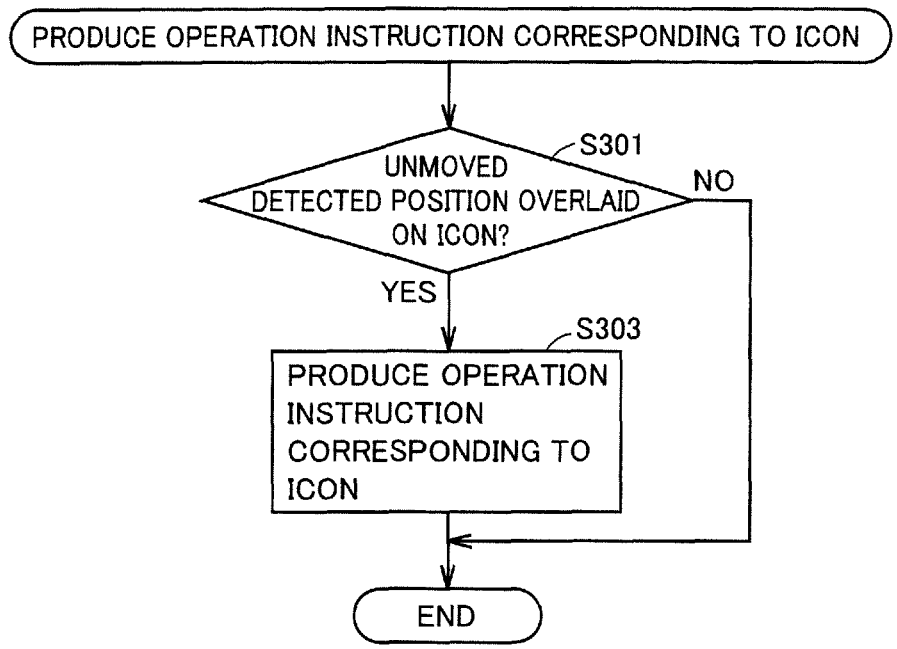
FIG. 11 shows in a flowchart form a flow of processing of determining operation instructions based on a movement of one instruction position.

Referring to FIG. 11, details of the processing in step S115 (production of the operation instruction corresponding to the icon) in FIG. 9 will be described below.

In a step S301, CPU 140 determines whether the unmoved detected position is overlaid on the icon display region or not. The icon display region is stored in a storage area such as SDRAM 344. Based on the stored display area and the detected position, CPU 140 determines whether the detected position is overlaid on the icon display region or not.

When the detected position is overlaid on the icon display region (YES in step S301), CPU 140 produces the operation instruction corresponding to the icon on which the detected position is overlaid.

When the detected position is not overlaid on the icon display region (NO in step S301), CPU 140 does not produce the operation instruction, and ends the processing of determining the operation instruction.

Description has been given on the case where projector 100 can perform both the operation based on the movement of the two detected positions and the icon operation based on the movement of one detected position. In this case, the user can perform extremely various operations by projector 100, using VUI screen picture 22. However, it is not essential that projector 100 performs both the operations described above.

For example, projector 100 may be configured such that it always change the image based on the relative movement between the two detected positions when this relative movement occurs. Conversely, projector 100 may be configured such that, when the two detected positions relatively move, it always determines whether one of the detected positions is on the predetermined region or not, and determines whether the image switching operation is to be performed.

Further, projector 100 may be able to select the operation corresponding to the movement of the detected position from among the plurality of kinds of operations. For example, projector 100 determines the operation corresponding to the movement of the detected position, according to the setting that is selected by the user through operation panel 330.

[Second Embodiment]

<Summary>

Projector 100 according to the first embodiment produces image data 472 by CPU 140 (or image processing unit 495) in projector 100. More specifically, projector 100 executes the program stored in projector 100 to produce image data 472.

For example, in the first embodiment, projector 100 can produce image data 472 for projection based on the externally accepted image data. For example, therefore, projector 100 can perform slide-show display of the plurality of images in a storage medium (SD, flash memory or the like) mounted on projector 100.

Conversely, a projector 100# according to the second embodiment does not produce image data 472 by itself. For using projector 100#, it is connected to an external electronic device 1000. According to the operation on the VUI screen picture, projector 100# instructs the change in image data 472 to be transmitted from electronic device 1000 to projector 100#. In the second embodiment, electronic device 1000 plays an important role in switching the displayed screen picture according to the VUI screen picture operation.

Figure 12:
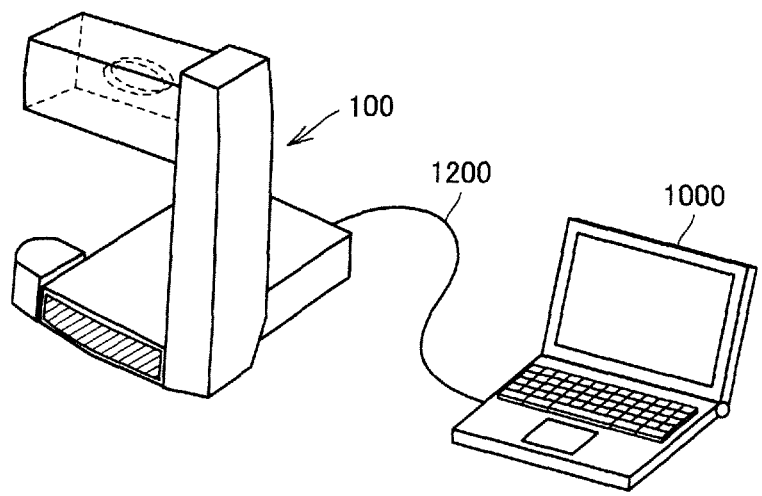
FIG. 12 shows a manner of use of a projector according to a second embodiment.

FIG. 12 illustrates projector 100# according to the second embodiment in use.

Referring to FIG. 12, projector 100# is connected to external electronic device 1000 via a cable 1200. Projector 100# may be connected to electronic device 1000 via a device or the like other than cable 1200. For example, projector 100# may be connected to electronic device 1000 by radio.

In the following description, electronic device 1000 is a notebook computer as illustrated in FIG. 12. However, electronic device 1000 is not restricted to the notebook computer. It is merely required that electronic device 1000 can be connected to projector 100#, and can perform the following operations.

Similarly to projector 100 according to the first embodiment, projector 100# is placed on desk 20 or the like. Projector 100# projects the main projection screen picture to the first projection target plane such as wall 30. Also, projector 100#projects the VUI screen picture to the second projection target plane such as desk 20. However, FIG. 12 does not show desk 20 and wall 30.

<Hardware Structure>

(Projector 100#)

A hardware structure of projector 100# is substantially the same as that of projector 100 according to the first embodiment. Therefore, description of the whole hardware structure is not repeated. However, external interface 343 (see FIG. 3) for connection to electronic device 100 will be described below in detail.

Projector 100# is connected to electronic device 1000 via external interface 343. External interface 343 receives the image data from electronic device 1000. External interface 343 provides the image data received from electronic device 1000 to CPU 140.

For example, an external connection terminal such as a USB (Universal Serial Bus) connector or an LAN (Local Area Network) connector may be used as external interface 343 in this embodiment. Alternatively, external interface 343 may be a radio transmitter-receiver performing radio communications with electronic device 1000.

(Electronic Device 1000)

Figure 13:
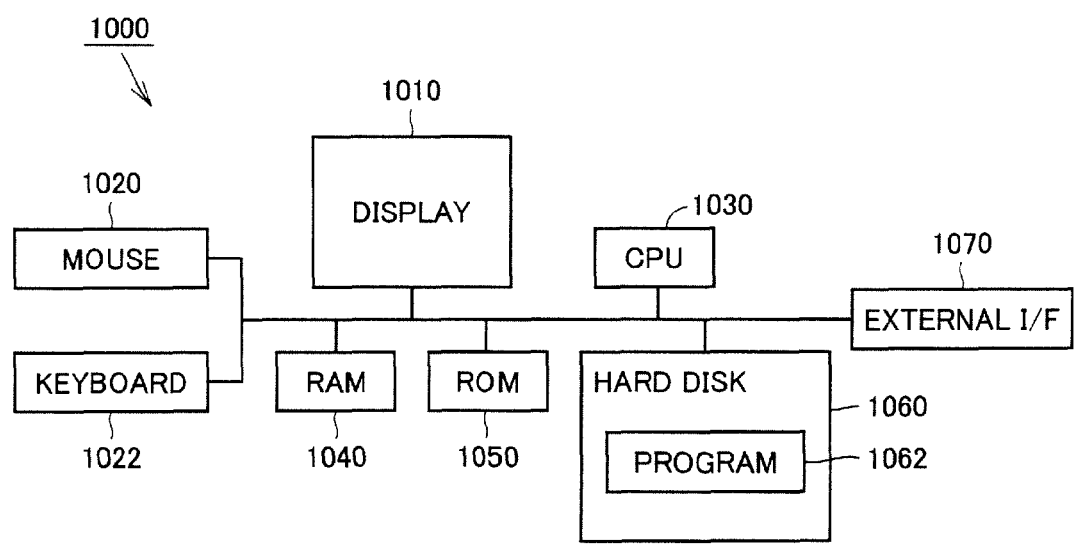
FIG. 13 shows in a block-diagram form a hardware structure of an electronic device.

Referring to FIG. 13, description will be given on a hardware structure of electronic device 1000. Electronic device 1000 includes a display 1010, a mouse 1020, a keyboard 1022, a CPU (Central Processing Unit) 1030, a RAM (Random Access Memory) 1040, a ROM (Read Only Memory) 1050, a hard disk 1060 and an external interface 1070.

Display 1010 displays an image based on the data in electronic device 1000. A mouse 1020 and keyboard 1022 accept external input operations. Mouse 1020 and keyboard 1022 are examples of the input devices. Electronic device 1000 may be provided with another input device such as a tablet.

CPU 1030 controls the operation of electronic device 1000 based on the instructions accepted by mouse 1020 or keyboard 1022. Specifically, CPU 1030 executes the program to provide operation instructions to various portions of electronic device 1000.

RAM 1040 temporarily stores the data. RAM 1040 is used as a working memory during execution of the program. ROM 1050 stores the data for a long term. Hard disk 1060 is a storage device capable of reading and writing the data. Hard disk 1060 stores a program 1062 and the like. Hard disk 1060 is an example of the storage device capable of reading and writing the data. Electronic device 1000 may include a storage device such as a flash memory instead of or in addition to hard disk 1060.

Program 1062 is executed by CPU 1030 to produce the image data. For example, program 1062 is presentation software. Although FIG. 13 shows only one program 1062, the storage device such as hard disk 1060 may store a plurality of programs 1062.

External interface 1070 connects electronic device 1000 and projector 100# together. For example, external interface 1070 is a USB connector or an LAN connector. Also, external interface 1070 may be a radio transmitter-receiver.

<Functional Structure>

Figure 14:
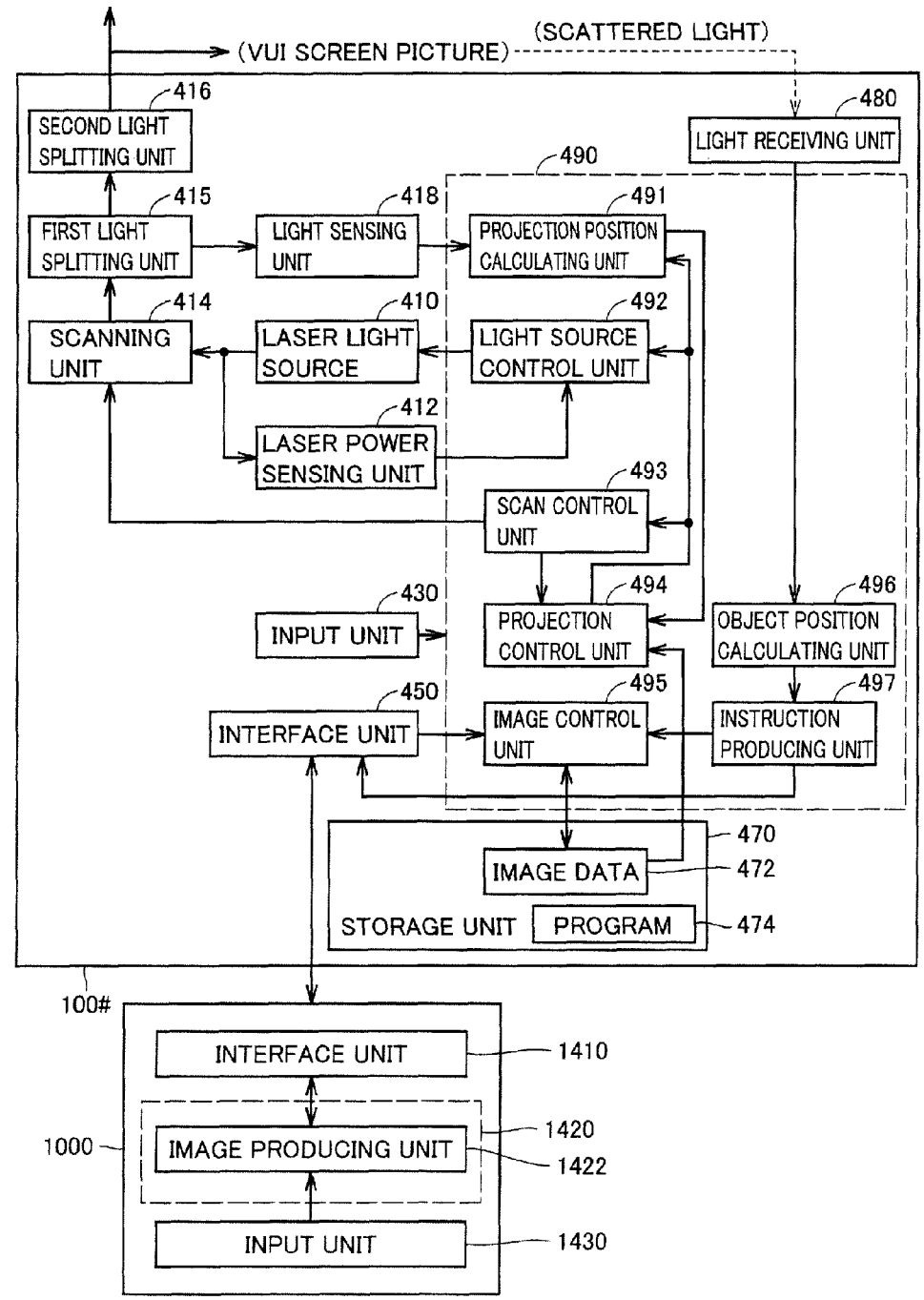
FIG. 14 shows a functional structure of a projector system.

Referring to FIG. 14, description will be given on a functional structure of a system (projector system) including a projector 100# and electric device 1000.

(Electronic Device)

The functional structure of electronic device 1000 will now be described.

Referring to FIG. 14, electronic device 1000 includes an interface unit 1410, a control unit 1420 and an input unit 1430.

Interface unit 1410 performs the data transmission and reception with respect to projector 100#. For example, interface unit 1410 receives an operation instruction from projector 100#. Interface unit 1410 transmits the image data to projector 100#. External interface 1070 corresponds to interface unit 1410.

Control unit 1420 controls the operations of various portions of electronic device 1000. CPU 1030 corresponds to control unit 1420. Control unit 1420 includes an image producing unit 1422. Image producing unit 1422 produces the image data according to an instruction. Control unit 1420 controls interface unit 1410, and transmits the produced image data to projector 100#.

Input unit 1430 accepts an instruction from outside. Mouse 1020 and keyboard 1022 correspond to input unit 1430.

(Projector)

The functional structure of projector 100# is substantially the same as that of projector 100 according to the first embodiment. Differences from the first embodiment will now be described.

Electronic device 1000 transmits the new image data to projector 100# based on the instruction for changing the image data. Projector 100# rewrites image data 472 in storage unit 470 with new image data provided from electronic device 100.

Instruction producing unit 497 of projector 100# produces the change instruction for the image data to be transmitted from electronic device 1000 to projector 100#, based on the object position data received from object position calculating unit 496. Instruction producing unit 497 controls interface unit 450 to send the change instruction to electronic device 1000.

Interface unit 450 receives the data transmitted from electronic device 1000 to projector 100# according to the change instruction. Projector 100# stores the data received via interface unit 450 in the storage area as image data 472.

A projection control unit 494 controls the operation of light source control unit 492 and scan control unit 493 based on new image data 472 that is produced by electronic device 1000 according to the change instruction. For example, projection control unit 494 reads image data 472 from storage unit 470 with cycles of a predetermined time or according to the operation instruction produced by instruction producing unit 497. Projection control unit 494 controls the operations of light source control unit 492 and scan control unit 493.

In this embodiment, image processing unit 495 is not essential. When image producing unit 1422 of electronic device 1000 performs the screen picture change according to the VUI screen picture operation, image processing unit 495 is not necessary. In this case, projector 100# can handle the data provided from electronic device 1000 as image data 472.

In this embodiment, the user can operate, through the VUI screen picture, the application software executed by electronic device 1000. Projector 100# is not required to store a program for producing the icon in the projected screen picture.

<Flow of Processing>

Figure 15:
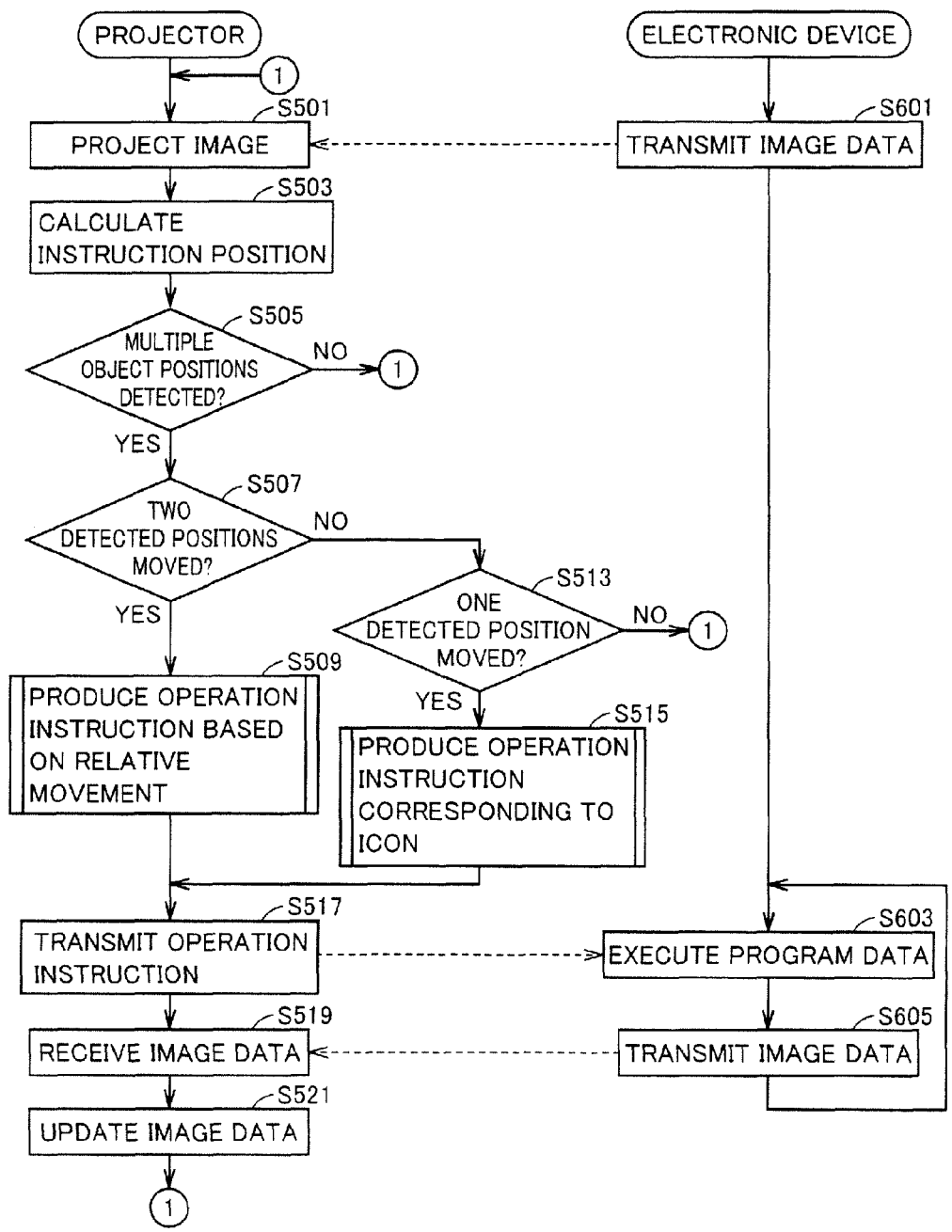
FIG. 15 shows, in a sequence diagram form, a flow of processing performed by the projector system.

FIG. 15 shows, in a sequence diagram form, a flow of the processing performed by the projector system.

First, the operation of projector 100# will be described. In a step S501, CPU 140 of projector 100# controls green laser 111, two-color laser 112 and scan mirror 115 to project, in two directions, the image that is based on the image data provided from electronic device 1000.

The processing of CPU 140 from a step S503 to a step S515 is substantially the same as that from step S103 to step S115 in FIG. 9. Therefore, description thereof is not repeated.

In a step S517, CPU 140 controls external interface 343 to transmit an operation instruction to electronic device 1000.

In a step S519, CPU 140 receives the image data from electronic device 1000 through external interface 343.

In a step S521, CPU 140 replaces image data 472 stored in storage unit 470 with the image data received in step S521. Thereafter, CPU 140 repeats the processing starting from step S501.

Then, the operation of electronic device 1000 will be described. In a step S601, CPU 1030 of electronic device 1000 controls external interface 1070 to transmit the image data to projector 100#. For example, electronic device 1000 transmits the image data corresponding to the image displayed by display 1010 to projector 100#.

In a step S603, CPU 1030 executes the program for producing the image data based on the operation instruction provided from projector 100#. This program is, e.g., software for presentation.

In a step S605, CPU 1030 controls external interface 1070 to transmit the image data produced as a result of the program execution to projector 100#. Thereafter, CPU 1030 repeats the processing starting from step S603.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display device for emitting laser light to display first and second images on first and second projection target planes, respectively, comprising:
   a laser light source for emitting the laser light;
   a scanning unit configured to scan said laser light on a frame-by-frame basis;
   a light splitting element for splitting said laser light scanned by said scanning unit into first laser light directed to said first projection target plane and second laser light directed to said second projection target plane;
   a photosensor for sensing said second laser light reflected by an external object on said second projection target plane; and
   a controller configured to control the operation of said image display device, wherein
   said controller is configured:
   to operate said scanning unit with a predetermined scan frequency,
   to control timing of emission of said laser light by said laser light source based on image data corresponding to said image and said scan frequency,
   to calculate a position of said external object based on a scan position of said laser light according to light sensing timing of said light sensor,
   to produce an instruction for changing said image data when a plurality of said positions are calculated according to said light sensing timing included in a scan period of a predetermined number of said frames and at least one of said positions moves, and
   to produce said instruction when a first calculated position is in a predetermined region and a second calculated position moves longer than a threshold distance.

2. The image display device according to claim 1, wherein said predetermined region is a display region of an icon.

3. The image display device according to claim 1, further comprising:
   an interface being capable of connecting said image display device to an electronic device, wherein
   said controller is configured to control output of said laser light based on said image data transmitted to said image display device from said electronic device connected to said image display device, and
   said interface is configured to transmit said instruction to said electronic device.

4. An image display device for emitting laser light to display first and second images on first and second projection target planes, respectively, comprising:
   a laser light source for emitting the laser light;
   a scanning unit configured to scan said laser light on a frame-by-frame basis;
   a light splitting element for splitting said laser light scanned by said scanning unit into first laser light directed to said first projection target plane and second laser light directed to said second projection target plane;
   a photosensor for sensing said second laser light reflected by an external object on said second projection target plane; and
   a controller configured to control the operation of said image display device, wherein said controller is configured:
   to operate said scanning unit with a predetermined scan frequency,
   to control timing of emission of said laser light by said laser light source based on image data corresponding to said image and said scan frequency,
   to calculate a position of said external object based on a scan position of said laser light according to light sensing timing of said light sensor,
   to produce an instruction for changing said image data when a plurality of said positions are calculated according to said light sensing timing included in a scan period of a predetermined number of said frames and at least one of said positions moves, and
   to produce said instruction when said two instruction positions move relatively to each other within a predetermined period.

5. The image display device according to claim 4, wherein said controller is configured to determine said instruction to be produced, based on a kind of relative movement of said two instruction positions.

6. The image display device according to claim 5, wherein said controller is configured to determine said instruction to be produced, based on a direction of movement of said two instruction positions.

7. The image display device according to claim 5, wherein said controller is configured to determine said instruction to be produced, based on increase or decrease in distance between said two instruction positions.

8. The image display device according to claim 5, wherein said controller is configured to produce said instruction when movement distances of said two instruction positions exceed a threshold.

9. A method for displaying an image comprising the steps of:
   emitting laser light by a laser light source;
   scanning said laser light by a scanning unit on a frame-by-frame basis;
   splitting said scanned laser light into first laser light directed to a first projection target plane and second laser light directed to a second projection target plane;
   sensing said second laser light reflected by an external object on said second projection target plane;
   operating said scanning unit with a predetermined scan frequency;
   controlling timing of emission of said laser light by said laser light source based on image data corresponding to said image and said scan frequency;
   calculating a position of said external object based on a scan position of said laser light according to timing of sensing of said second laser light; and
   producing an instruction for changing said image data based on the facts that a plurality of said positions are calculated according to timing included in a scan period of a predetermined number of frames and that at least one of said positions moves,
   said step of producing said instruction includes a step of producing said instruction when a calculated first position is in a predetermined region and a second calculated position moves longer than a threshold distance.

10. The method according to claim 9, wherein said predetermined region includes a display region of an icon.

* * * * *